United States Patent

Ott

[11] Patent Number: 5,829,730
[45] Date of Patent: Nov. 3, 1998

[54] MOTORCYCLE FRON MOTOR MOUNT

[76] Inventor: Vern D. Ott, 1839 Rte., 746 S., Cardington, Ohio 43315

[21] Appl. No.: 602,961

[22] Filed: Feb. 16, 1996

Related U.S. Application Data

[63] Continuation-in-part of Ser. No. 26,192, Jul. 21, 1994, Pat. No. Des. 367,249.

[51] Int. Cl.⁶ .................................................. F16M 13/00
[52] U.S. Cl. ........................ 248/635; 248/634; 267/293; 267/294
[58] Field of Search ................................. 248/635, 634, 248/27.1, 659, 570, 638; 267/293, 294, 141.3, 141.4, 141.5; 180/228

[56] References Cited

U.S. PATENT DOCUMENTS

| | | | |
|---|---|---|---|
| 2,089,761 | 8/1937 | Pielstick | 248/659 |
| 2,178,401 | 10/1939 | Meyerhoefer | 248/635 |
| 2,215,743 | 9/1940 | Saurer | 248/22 |
| 2,447,697 | 10/1948 | Gotschall | 138/56 |
| 2,597,800 | 5/1952 | Hussman | 248/638 |
| 3,052,435 | 9/1962 | Roller | 248/8 |
| 3,261,422 | 7/1966 | Jensen | 180/69 |
| 3,482,808 | 12/1969 | Rofe et al. | 248/659 |
| 4,213,718 | 7/1980 | Lumby | 248/635 |
| 4,288,063 | 9/1981 | Brenner et al. | 248/635 |
| 4,522,378 | 6/1985 | Nelson | 248/635 |
| 5,158,269 | 10/1992 | Hein et al. | 248/635 |
| 5,390,758 | 2/1995 | Hunter et al. | 248/635 |
| 5,431,260 | 7/1995 | Gross et al. | 267/293 |

FOREIGN PATENT DOCUMENTS 4241853  6/1994  Germany.

*Primary Examiner*—Leslie A. Braun
*Assistant Examiner*—Kimberly T. Wood
*Attorney, Agent, or Firm*—Kremblas, Foster, Millard & Pollick

[57] ABSTRACT

A motor mount for a motorcycle includes a plate, cylindrical sleeve, and two grommets. The grommets are elastomeric and are on opposite sides of the plate. The grommets frictionally engage the sleeve which is inserted through each of the grommets and through a hole in the middle of the plate. Additional holes maybe included in the plate for further securing the motor mount to different portions of the motorcycle. The grommets may be of similar size. One side of the plate may have a cavity for allowing better wear of the grommets.

9 Claims, 2 Drawing Sheets

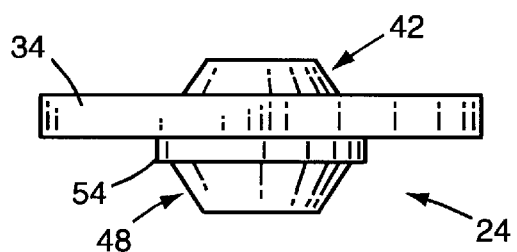
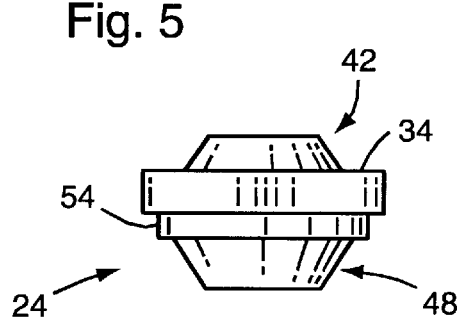
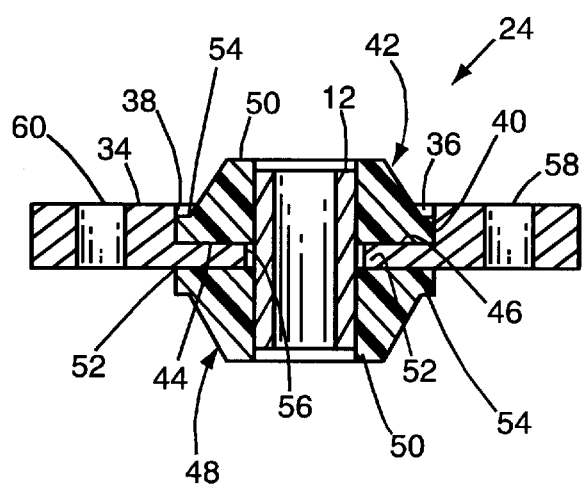
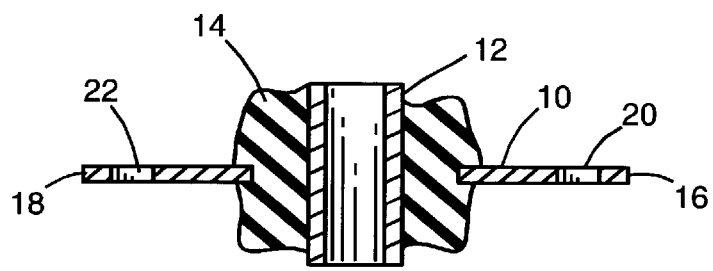

MOTORCYCLE FRON MOTOR MOUNT

REFERENCE TO OTHER APPLICATIONS

This application is a continuation-in-part of application Ser. No. 29/026,192; filed Jul. 21, 1994; now U.S. Pat. No. D 367,249; dated Feb. 20, 1996.

FIELD OF THE INVENTION

This invention relates to motor mounts for the front of a motorcycle.

BACKGROUND OF THE INVENTION

Harley Davidson motorcycles have a frame supporting the motor, fuel tank, and rider. The frame is suspended between front and rear wheels. Motor mounts are secured to the motorcycle to dampen the impacts and shocks encountered by the wheels of the motorcycle traversing various terrain.

This invention is primarily concerned with the front motor mount of a Harley Davidson motorcycle. FIG. 7 illustrates one of the conventional front motor mounts currently in use. It includes a thin plate 10 concentrically mounted around and extending radially outwardly of a sleeve 12 and held in place by a molded elastomeric resinous substance 14. Sleeve 12 is designed to accommodate a bolt or stud for securing the shock absorber motor mount in place between the two parallel plates. One of the plates is secured to, or is a part of, the frame and the other plate is secured to the wheel carriage. Radially extending ears 16 and 18 extending radially of sleeve 12 and forming a part of plate 10 have holes 20 and 22 there through to accommodate bolts for attaching the plate to the lower of the flanges, which in turn is secured to and is a part of the wheel carriage.

There are two particular problems with the motor mount illustrated in FIG. 7, and the first is the elastomeric material 14, which is molded and sealingly attached to sleeve 12 and plate 10. The elastomeric material continually receives impacts during operation of the motorcycle, and over a period of time, due to compression, expansion and flexing, fatigue cracks appear. Because the resin is molded integral with the metallic parts 10 and 12, any cracks which occur quickly propagate from one surface to another, and the shock absorbing qualities of the product quickly become nonfunctional.

Another problem is the thin nature of the plate 10. The thinness, conventionally about ⅛ inch thick, allows a flexing of the ears 16 and 18 which translates into a twisting action at the inner edge of the plate where it is molded to the resin substance 14. This creates a differential flexing of the metallic plate 10 and heat generation at its inner periphery. Both the flexing and the heat problem contribute to the early break-down of the resinous substance.

Another of the structural problems with the FIG. 7 shock absorber is that it is sandwiched between the two plates as described above, such that the plates rest upon the elastomeric resin substance 14. Holes through the plates to accommodate the sleeve 12 and abut the elastomeric resin while surrounding the sleeve. Thus, the plates squeeze resin substance 14 with every impact and then allow it to expand. All the while the plates are pressing in an annulus around the sleeve 12 which exert forces tending to pull the resin away from sleeve 12.

Description of the Preferred Embodiment

This invention solves some of the problems of the prior art shock absorber illustrated in FIG. 7. One thing it does is provide two grommets of identical shape designed to fit over and frictionally engage the sleeve. Note that the grommets, frictionally engage the sleeve, but are not integrally bonded to the sleeve, as was described in relation to FIG. 7.

Each grommet has an exterior surface conforming generally to the frustum of a cone. The cone shape is aligned with an axis which extends through the sleeve and through the aperture of each grommet frictionally engaging the exterior surface of the sleeve.

The plate in this invention has a thickness which is substantially greater than plate 10 of the prior art, for example, up to ⅜ of an inch thick at the ear sections. Accordingly the plate of this invention is much more rigid and less likely to have the same degree of flexing as the prior art.

Because the upper grommet tends to deteriorate more quickly than the lower of the two grommets, a strengthening mechanism is incorporated into the combination. Specifically, a cavity is formed in the surface of the plate which faces upwardly toward the plate secured to the motorcycle frame, and the shape of the cavity is the same as the facing surface of the grommet which fits down into the cavity against the cavity bottom.

The grommets are interchangeable, one with the other. Each includes a radially extending flange projecting from the wider end of the grommet. The flange includes a peripheral surface which is upstanding and is juxtaposed to the side wall surface of the cavity in the upper surface of the metal plate.

Objects of the invention not understood will be fully appreciated upon a reading of the Description of the Preferred Embodiment and a review of the drawings.

BRIEF DESCRIPTION OF THE DRAWINGS

FIG. 4 is a side elavational view of the motor mount of FIG. 2;

FIG. 5 is an end elavational view of the motor mount of FIG. 3;

FIG. 6 is a sectional view, taken along line 6—6 of FIG. 2; and

FIG. 7 is a sectional view similar to FIG. 6, but illustrating a motor mount comprising the prior art.

DETAILED DESCRIPTION OF THE PREFERRED EMBODIMENT

Figure 1:
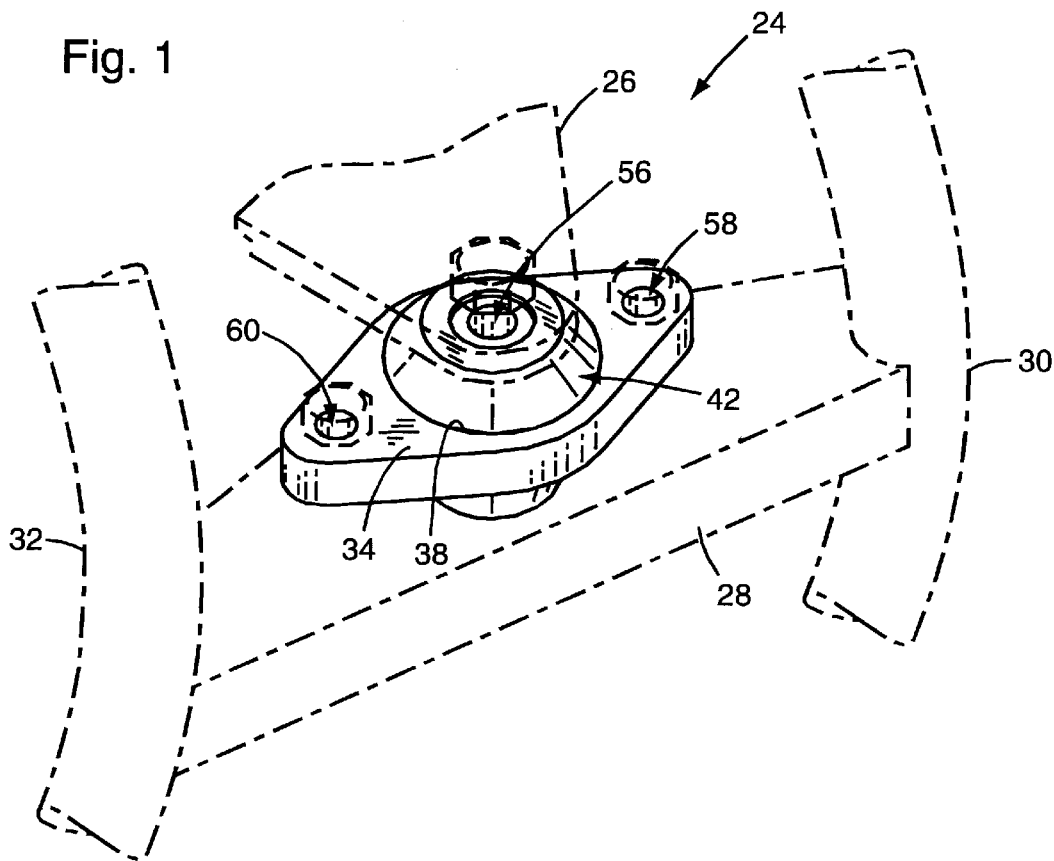
FIG. 1 shows the motor mount of this invention in perspective, illustrated in operative position, between a plate secured to a motorcycle frame and a plate secured to a wheel carriage, which are shown in phantom.

Looking now to FIG. 1, the motor mount 24 of this invention comprises four separate parts, mounted together as a unitary operative element, namely, a motor mount to serve as a shock absorber between an upper flange 26 forming a part of a motorcycle frame and a lower flange 28, secured on each side to elements 30 and 32 of a wheel carriage.

FIG. 6 illustrates the shock absorbing motor mount 24 in cross section and it includes a plate 34 having a counter sunk or recessed cavity 36 in its upward surface facing toward plate 26.

Figure 2:
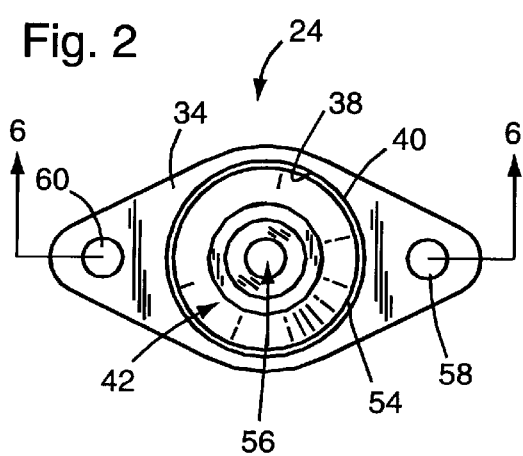
FIG. 2 is a top plan view of the motor mount of FIG. 1.
Figure 3:
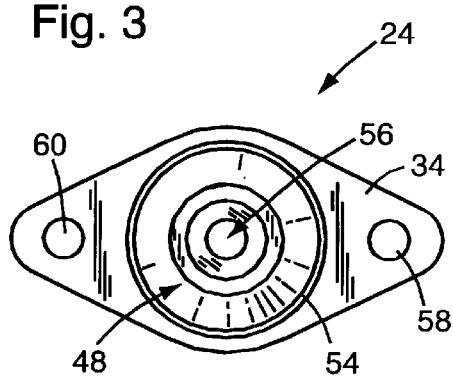
FIG. 3 is a bottom plan view of the motor mount of FIG. 1.

In the preferred embodiment and perhaps as best seen in FIG. 2, the cavity 36 is in the form of a cylinder with its outer sidewall 38 having a cross-sectional shape corresponding to the peripheral shape 40 of upper grommet 42.

Note that the lower or wider surface 44 of the frusto-conical grommet shape 42 is in engagement with the bottom surface 46 of cavity 36.

An observation of FIG. 6 will show that the upper grommet 42 and the lower grommet 48 are identical in shape, but the lower grommet 48 is not recessed into a cavity 36, such as is shown to accommodate the upper grommet 42, for reasons which were explained above. Note that a radially extending flange 54 projects from the widest of the parallel surfaces 50 and 52 of each grommet. The strengthening effect of the flange 54 is self-evident, and in addition it provides a larger abutment surface between the cavity sidewall 38 and the grommet 42. As is clear from the drawing, the impact absorbed tends to flatten grommet 42; the sidewall 38 resists the flattening.

It will be observed that grommet surfaces 50 and 52 are parallel with each other and that the flanges 26 and 28 are parallel with each other as shown in FIG. 1. Each of the smaller cross-sectional surfaces 50 of the grommets 42, 48 abuts one of the flat planar surfaces of plates 26 and 28.

Looking again to FIG. 1, and for purposes of illustration, bolt heads are shown in phantom, penetrating the plurality of holes through plate 34. The central hole 56 is axially aligned with the aperture through the grommets and the sleeve 12. The side holes 58 and 60 in the thicker or ear sections of plate 34 accommodate bolts to tighten the motor mount against plate 28. Alternatively, studs could extend from the plates to receive nuts.

During the course of experiments, it was discovered that for various accommodations a Durometer hardness of 15D, 27D and 35D are the most useful for various applications, depending upon the desired stiffness of the shock absorbing characteristics of the desired motor mount.

Having thus described in the invention its preferred embodiment, it will be clear that certain modifications may be made in the invention without departing from the spirit thereof. For example, the illustrated motor mount has a circular periphery it could have alternate shapes if desired. Further, the cavity 36 is illustrated as being only in the upper surface of plate 34; however, if desired such a cavity could be formed in both the upper and lower surfaces of the plate. Additionally, a washer could be mounted in cavity 36 intermediate bottom surface 46 and wide planar surface 52 of grommet 42 to minimize friction and to assist in relative movement between the surfaces of the grommet and the plate. Accordingly, it is not intended that the language used to describe, nor the drawings illustrating the same, be limiting on the invention. Rather it is intended that the invention be limited only by the scope of the appended claims.

I claim:

1. A motor mount on a motorcycle, comprising:

a plate, said plate including an upward surface, a lower surface and a hole, said hole being circumscribed by a cavity in said plate;

a cylindrical sleeve in said hole and extending from said plate;

a first grommet on said upward surface of said plate and surrounding and frictionally engaging said sleeve; and a second grommet on said lower surface of said plate and surrounding and frictionally engaging said sleeve, each said grommet having an exterior shape corresponding generally to the frustum of a cone having an axis, each said grommet having two parallel surfaces perpendicular to said axis, one said parallel surface on each said grommet having a larger cross-sectional area than the other parallel surface, each of said larger parallel surfaces being juxtaposed to said plate.

2. The motor mount of claim 1 wherein said first grommet includes a radially extending flange at its said larger parallel surface, said flange having a periphery extending parallel with a sidewall of said cavity.

3. The motor mount of claim 2 wherein said grommets are of identical shape and interchangeable as to location on the unitary motor mount.

4. The motor mount of claim 3 further comprising a first flange and a second flange secured to said sleeve, said first flange being further attached to a wheel carriage and said second flange being further attached to a frame to absorb impacts and shocks from a wheel of a motorcycle and minimize transfer of said impacts and shocks to the frame.

5. The motor mount of claim 1 further comprising a first flange and a second flange secured to said sleeve, said first flange being further attached to a wheel carriage and said second flange being further attached to a frame to absorb impacts and shocks from a wheel of a motorcycle and minimize transfer of said impacts and shocks to the frame.

6. The motor mount of claim 5 wherein said first grommet includes a radially extending flange at its said larger parallel surface, said flange having a periphery extending parallel with a sidewall of said cavity.

7. The motor mount of claim 6 wherein said grommets are of identical shape and interchangeable as to location on the unitary motor mount.

8. The motor mount of claim 1 wherein said grommets are of identical shape and interchangeable as to location on the unitary motor mount.

9. The motor mount of claim 1 wherein said grommets have a Durometer hardness in the range of about 15 D to about 35 D.

* * * * *